(12) United States Patent
Zheng et al.

(10) Patent No.: US 10,550,642 B2
(45) Date of Patent: Feb. 4, 2020

(54) WELL CONSTRUCTION DISPLAY

(71) Applicant: Schlumberger Technology Corporation, Houston, TX (US)

(72) Inventors: Shunfeng Zheng, Katy, TX (US); Vishwanathan Parmeshwar, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 884 days.

(21) Appl. No.: 14/982,917

(22) Filed: Dec. 29, 2015

(65) Prior Publication Data

US 2017/0167200 A1    Jun. 15, 2017

Related U.S. Application Data

(60) Provisional application No. 62/267,687, filed on Dec. 15, 2015.

(51) Int. Cl.
| | |
|---|---|
| *E21B 7/04* | (2006.01) |
| *E21B 44/02* | (2006.01) |
| *E21B 47/00* | (2012.01) |
| *E21B 47/024* | (2006.01) |
| *G01G 19/14* | (2006.01) |
| *G01L 5/04* | (2006.01) |
| *G05B 19/05* | (2006.01) |

(52) U.S. Cl.
CPC .............. *E21B 7/04* (2013.01); *E21B 44/02* (2013.01); *E21B 47/0006* (2013.01); *E21B 47/024* (2013.01); *G01G 19/14* (2013.01); *G01L 5/04* (2013.01); *G05B 19/05* (2013.01); *G05B 2219/1185* (2013.01)

(58) Field of Classification Search
CPC ........ E21B 7/04; E21B 44/02; E21B 47/0006; E21B 47/024; G01G 19/14; G01L 5/04; G05B 19/05; G05B 2219/1185
See application file for complete search history.

(56) References Cited

U.S. PATENT DOCUMENTS

| | | | |
|---|---|---|---|
| 6,050,348 | A | 4/2000 | Richarson et al. |
| 6,629,572 | B2 | 10/2003 | Womer et al. |
| 7,802,634 | B2 | 9/2010 | Boone |
| 7,823,655 | B2 | 11/2010 | Boone et al. |

(Continued)

FOREIGN PATENT DOCUMENTS

WO    2015041632 A1    3/2015

*Primary Examiner* — Yong-Suk Ro
(74) *Attorney, Agent, or Firm* — Rachel E. Greene (57) ABSTRACT

A method for steering a downhole tool in a wellbore includes measuring a tool face when the drill bit is off-bottom, measuring an angular position of a drill string when the drill bit is off-bottom, and measuring a torque on the drill string when the drill bit is off-bottom. Measuring the tool face when the drill bit is on-bottom and measuring the torque on the drill string when the drill bit is on-bottom. Determining a transfer function comprising the angular position of the quill, the difference between the tool face when the drill bit is on-bottom and off-bottom, and the difference between the torque when the drill bit is on-bottom and off-bottom. The angular position of the drill string is varied at the surface, based upon the transfer function, to reduce an angle between the tool face when the drill bit is on-bottom and a target tool face.

24 Claims, 8 Drawing Sheets

(56) References Cited

U.S. PATENT DOCUMENTS

| | | |
|---|---|---|
| 8,528,663 B2 | 9/2013 | Boone |
| RE44,956 E | 6/2014 | Richardson et al. |
| RE44,973 E | 7/2014 | Richardson et al. |
| 8,939,233 B2 | 1/2015 | Edbury et al. |
| 9,650,880 B2 | 5/2017 | Bowley et al. |
| 2009/0090555 A1* | 4/2009 | Boone .................. E21B 44/02 175/45 |
| 2012/0158761 A1* | 6/2012 | Aamodt ................ E21B 44/00 707/758 |
| 2015/0091737 A1 | 4/2015 | Richardson et al. |
| 2015/0300151 A1 | 10/2015 | Mohaghegh |
| 2015/0322778 A1 | 11/2015 | Kelsall et al. |
| 2015/0330204 A1 | 11/2015 | Hildebrand et al. |
| 2016/0168973 A1 | 6/2016 | Dykstra et al. |
| 2016/0237802 A1 | 8/2016 | Boone et al. |

\* cited by examiner

WELL CONSTRUCTION DISPLAY

CROSS-REFERENCE TO RELATED APPLICATION

This application claims priority to U.S. Provisional Patent Application having Ser. No. 62/267,687, filed on Dec. 15, 2015. The entirety of this priority provisional patent application is incorporated by reference herein.

BACKGROUND

The oilfield industry has traditionally been serviced by disparate service provider companies working in concert to complete the well construction process. For any given operation, there may be one or more service providers involved. For example, during drilling, one service provider may provide the rig, and a second service provider may provide the control system. In the meantime, a third service provider may provide fluid systems, and a fourth service provider may provide the downhole system.

Visualization of the well construction process may be used to facilitate safe and efficient oilfield operations. More particularly, information originating from the different disparate systems developed by service providers may be processed and displayed for different rig crews. Today, displaying the right information to the right people at the right time remains a challenge.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for steering a downhole tool in a wellbore is disclosed. The method includes measuring a tool face when the drill bit is off-bottom, measuring an angular position of a drill string at and/or above the surface when the drill bit is off-bottom, and measuring a torque on the drill string when the drill bit is off-bottom. The method also includes measuring the tool face when the drill bit is on-bottom and measuring the torque on the drill string when the drill bit is on-bottom. The method also includes determining a transfer function including the angular position of the drill string at and/or above the surface, the difference between the tool face when the drill bit is on-bottom and off-bottom, and the difference between the torque when the drill bit is on-bottom and off-bottom. The angular position of the drill string is varied at the surface, based upon the transfer function, to reduce an angle between the tool face when the drill bit is on-bottom and a target tool face.

A system for steering a downhole tool in a wellbore is also disclosed. The system includes a first sensor coupled to the downhole tool and a second sensor positioned at a surface location. The first sensor, the second sensor, or both sensors measure (1) a tool face when a drill bit of the downhole tool is off-bottom, (2) an angular position of a drill string at and/or above the surface when the drill bit is off-bottom, (3) a torque on the drill string when the drill bit is off-bottom, (4) the tool face when the drill bit is on-bottom, and (5) the torque on the drill string when the drill bit is on-bottom. The system also includes a processor that determines a transfer function including the angular position of the drill string at and/or above the surface, the difference between the tool face, and the difference between the torque. The processor also causes the angular position of the drill string at and/or above the surface to vary, based at least partially upon the transfer function, to reduce an angle between the tool face when the drill bit is on-bottom and a target tool face.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
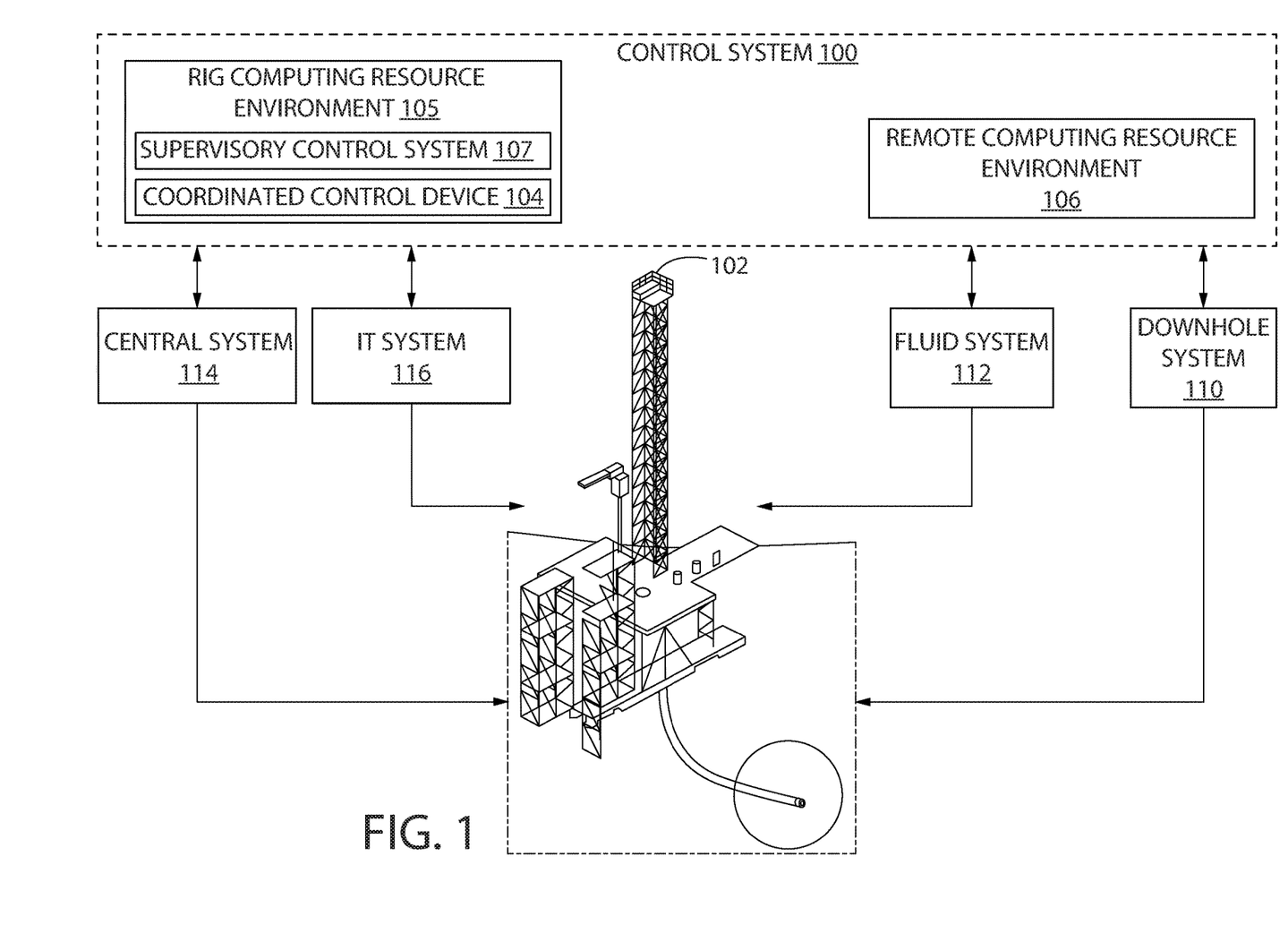
FIG. 1 illustrates a conceptual, schematic view of a control system for a drilling rig 102, according to an embodiment.

FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection). In some embodiments, the remote computing resource environment 106 may be at least partially located onsite, e.g., allowing control of various aspects of the drilling rig 102 onsite through the remote computing resource environment 105 (e.g., via mobile devices). Accordingly, "remote" should not be limited to any particular distance away from the drilling rig 102.

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. These systems 110, 112, 114 may also be examples of "subsystems" of the drilling rig 102, as described herein. In some embodiments, the drilling rig 102 may include an information technology (IT) system 116. The downhole system 110 may include, for example, a bottom hole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, draw works, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, safety concerns for different control systems, etc.). An embodiment of the control system 100 that is unified, may, however, provide control over the drilling rig 102 and its related systems (e.g., the downhole system 110, fluid system 112, and/or central system 114, etc.). Further, the downhole system 110 may include one or a plurality of downhole systems. Likewise, fluid system 112, and central system 114 may contain one or a plurality of fluid systems and central systems, respectively.

In addition, the coordinated control device 104 may interact with the user device(s) (e.g., human-machine interface(s)) 118, 120. For example, the coordinated control device 104 may receive commands from the user devices 118, 120 and may execute the commands using two or more of the rig systems 110, 112, 114, e.g., such that the operation of the two or more rig systems 110, 112, 114 act in concert and/or off-design conditions in the rig systems 110, 112, 114 may be avoided.

Figure 2:
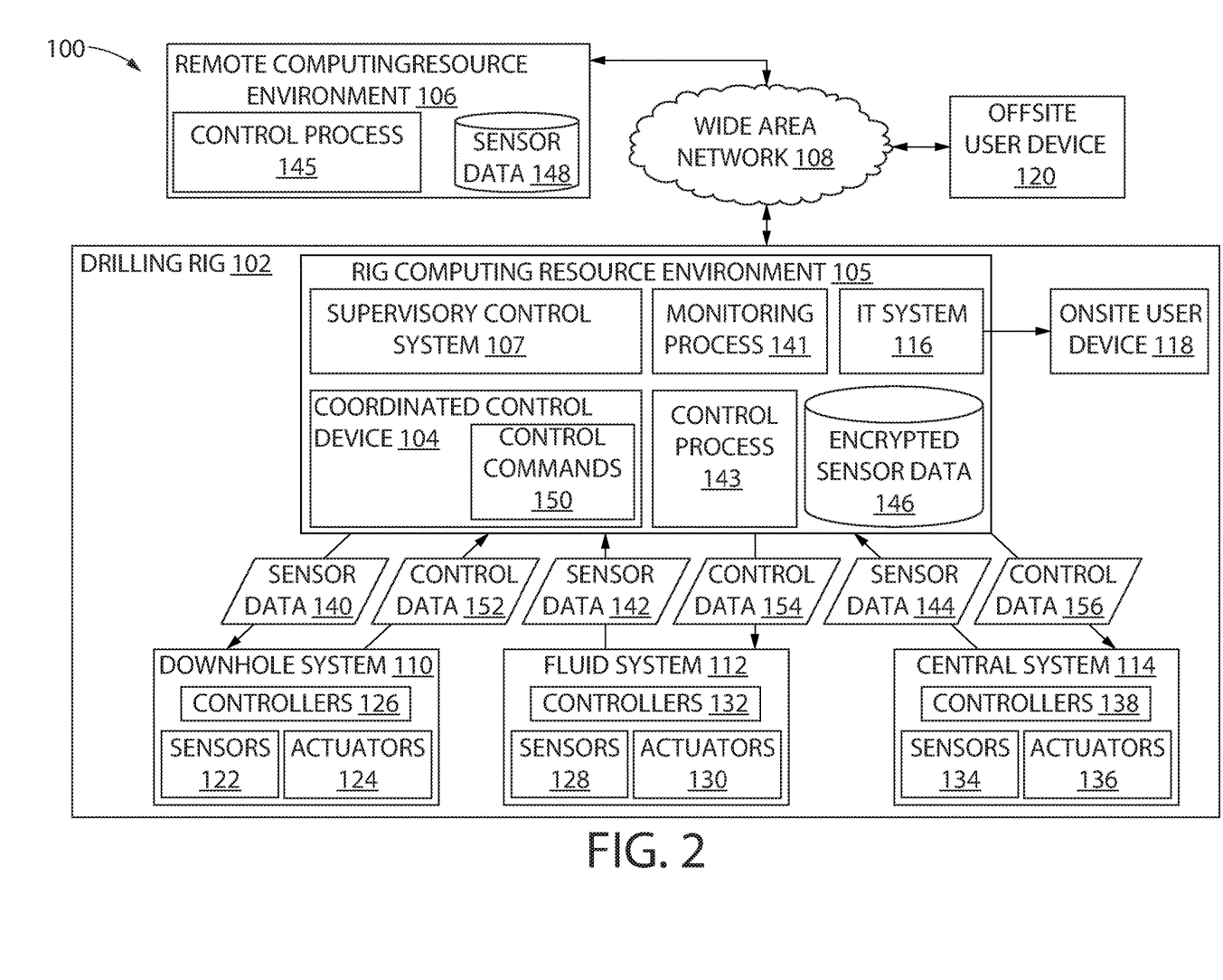
FIG. 2 illustrates a conceptual, schematic view of the control system, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The user devices 118 and/or 120 may be examples of a human-machine interface. These devices 118, 120 may allow feedback from the various rig subsystems to be displayed and allow commands to be entered by the user. In various embodiments, such human-machine interfaces may be onsite or offsite, or both.

The systems of the drilling rig 102 may include various sensors, actuators, and controllers (e.g., programmable logic controllers (PLCs)), which may provide feedback for use in the rig computing resource environment 105. For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data feedback to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data into the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. In yet another embodiment, measurements of the same physical properties using different sensors may provide information about the relative quality of each measurement, resulting in a "higher" quality measurement being used for rig control, and process applications. The variation in measurements at different locations over time may be used to determine equipment performance, system performance, scheduled maintenance due dates, and the like. Furthermore, aggregating sensor data from each subsystem into a centralized environment may enhance drilling process and efficiency. For example, slip status (e.g., in or out) may be acquired from the sensors and provided to the rig computing resource environment 105, which may be used to define a rig state for automated control. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands. Furthermore, for mode based controllers which employ complex computation to reach a control set point, which are typically not implemented in the subsystem PLC controllers due to complexity and high computing power demands, the coordinated control device 104 may provide the adequate computing environment for implementing these controllers.

In some embodiments, control of the various systems of the drilling rig 102 may be provided via a multi-tier (e.g., three-tier) control system that includes a first tier of the controllers 126, 132, and 138, a second tier of the coordinated control device 104, and a third tier of the supervisory control system 107. The first tier of the controllers may be responsible for safety critical control operation, or fast loop feedback control. The second tier of the controllers may be responsible for coordinated controls of multiple equipment or subsystems, and/or responsible for complex model based controllers. The third tier of the controllers may be responsible for high level task planning, such as to command the rig system to maintain certain bottom hole pressure. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The sensor data 140, 142, 144 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a client (e.g., a thin client) configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property set point, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. Furthermore, the monitoring process 141 may monitor sensor data and determine the quality of one or a plurality of sensor data. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. The virtual computing system and/or computers may provide a human-machine interface through which a user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

Figure 3:
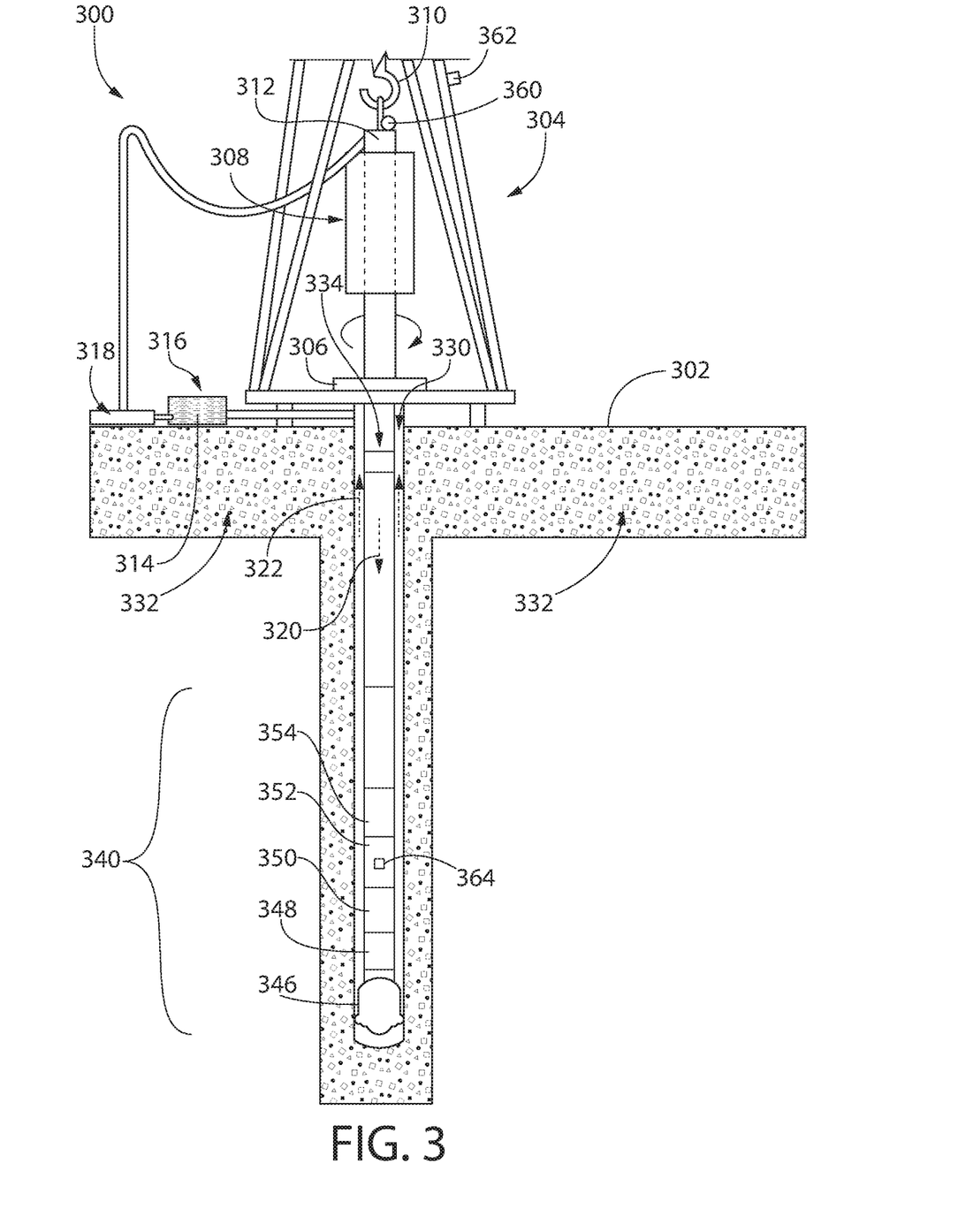
FIG. 3 depicts a schematic side view of an illustrative well site system including a drill string and a downhole tool disposed within a wellbore, according to an embodiment.

FIG. 3 illustrates a cross-sectional view of a wellsite system 300 including a downhole tool 340 positioned in a wellbore 330, according to an embodiment. The wellbore 330 may be formed in a subsurface formation 332 by rotary drilling in a manner that is well known to those skilled in the art. Some embodiments may also use directional drilling, as discussed below.

The well site system 300 may include a platform and derrick assembly 304 positioned over the wellbore 330, with the derrick assembly 304 including a rotary table 306, a drilling device 308 such as a top drive or a kelly, a hook 310, and a rotary swivel 312. In a drilling operation, a drill string 334 may be rotated by the rotary table 306, which engages the drilling device (e.g., the kelly) 308 at the upper end of the drill string 334 or the drill string 334 may be rotated directly by the drilling device (e.g., the top drive) 308. The drill string 334 may be suspended from the hook 310, attached to a traveling block (not shown), through the drilling device 308 and the rotary swivel 312, which permits rotation of the drill string 334 relative to the hook 310.

Drilling fluid or mud 314 may be stored in tank 316 at the well site. A pump 318 may deliver the drilling fluid 314 to the interior of the drill string 334 via a port in the swivel 312, which causes the drilling fluid 314 to flow downwardly through the drill string 334, as indicated by the directional arrow 320. The drilling fluid exits the drill string 334 via ports in a drill bit 346, and then circulates upwardly through the annulus region between the outside of the drill string 334 and the wall of the wellbore 330, as indicated by the directional arrows 322. In this known manner, the drilling fluid lubricates the drill bit 346 and carries formation cuttings up to the surface as it is returned to the pit 314 for recirculation.

In the illustrated embodiment, the downhole tool 340 may be or include a bottom hole assembly ("BHA"). The downhole tool 340 may include a drill bit 346, a rotary steerable system ("RSS") 348, and a motor (e.g., a mud motor) 350. The downhole tool 340 may also include a logging-while-drilling ("LWD") tool 352 and a measurement-while-drilling ("MWD") tool 354. The LWD tool 352 may be configured to measure one or more formation properties and/or physical properties as the wellbore 330 is being drilled or at any time thereafter. The MWD tool 354 may be configured to measure one or more physical properties as the wellbore 330 is being drilled or at any time thereafter. The formation properties may include resistivity, density, porosity, sonic velocity, gamma rays, and the like. The physical properties may include pressure, temperature, wellbore caliper, wellbore trajectory, a weight-on-bit, torque-on-bit, vibration, shock, stick slip, and the like. The LWD tool 352 may transmit its measurements to the MWD tool 354. The MWD tool 354 may then group the sets of data from the LWD tool 352 and the MWD tool 354 and prepare the data stream for transmission to the surface location after proper encoding.

One or more surface sensors (one is shown: 360) may be positioned at or above the surface 302. For example, the surface sensor 360 may be positioned on and/or coupled to the platform and derrick assembly 304, the rotary table 306, the drilling device 308, the hook 310, the rotary swivel 312, or a combination thereof. The surface sensor 360 may be configured to measure one or more properties at the surface 302 related to any of the components listed above. For example, the surface sensor 360 may measure the torque on the drill string 334, the angular position of the drilling string 334, the weight on the drill string 334, or a combination thereof.

As used herein, the "tool face" refers to the angle measured in a plane perpendicular to a central longitudinal axis through the drill string 334 that is between a reference direction on the drill string 334 and a fixed reference. For near-vertical wells, north may be the fixed reference, and the angle is the magnetic tool face. For more-deviated wells, the top of the wellbore 330 may be the fixed reference, and the angle is the gravity tool face.

One or more video cameras (one is shown: 362) may also be positioned at or above the surface 302. For example, the video camera 362 may be positioned on and/or coupled to the platform and derrick assembly 304, the drilling device 308, the hook 310, the rotary swivel 312, or a combination thereof. In other embodiments, the video camera 362 may be positioned on and/or coupled to the rig floor, the upper mast, the draw works skid, the shale shaker tank, the catwalk, or the like. The video camera 362 may be configured to record video of any of the components listed above.

One or more downhole sensors (one is shown: 364) may be positioned within the wellbore 330. The downhole sensor 364 may be coupled to and/or positioned within a casing or liner (not shown) in the wellbore 330, the drill string 334, or the downhole tool 340. For example, the downhole sensor 362 may be part of the RSS 348, the LWD tool 352, or the MWD tool 354. The downhole sensor 362 may be configured to measure any data related to the steering of the downhole tool 340, such as the gravitational or magnetic tool face, the torque on the drill string 334, the azimuth angle, the inclination angle, the weight on the drill bit 346, or a combination thereof. In other embodiments, the downhole sensor 362 may be configured to measure any data related to the formation properties listed above, the physical properties listed above, or a combination thereof.

Figure 4:
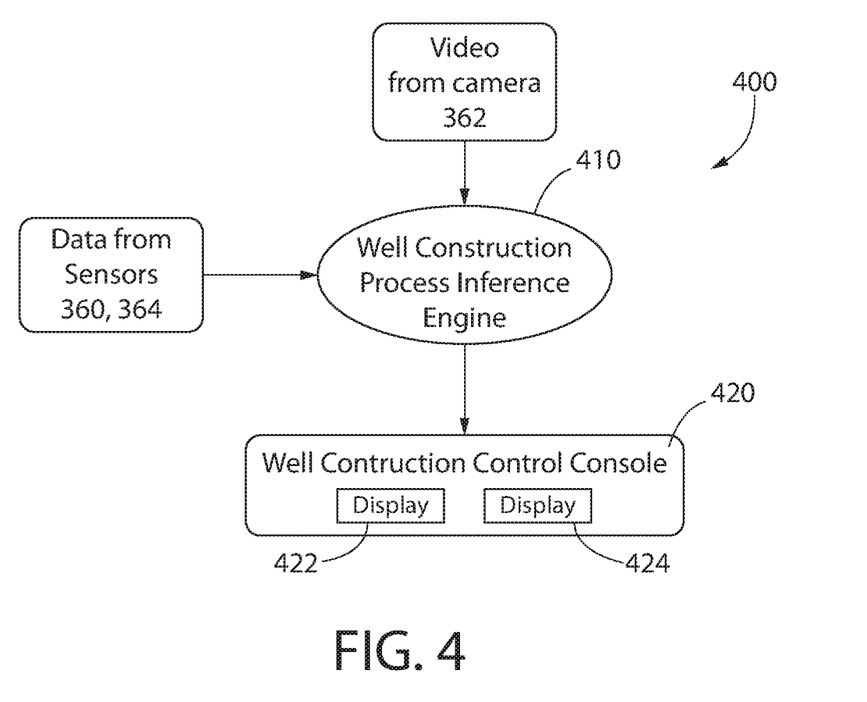
FIG. 4 illustrates a schematic view of a well construction control and display system, according to an embodiment.

FIG. 4 illustrates a schematic view of a well construction control and display system 200, according to an embodiment. The system 400 may include a well construction process inference engine 410 and a well construction control console 420. The well construction process inference engine 410 may receive the data from the surface sensor 360, the video camera 362, and the downhole sensor 364. The well construction process inference engine 410 may then determine (e.g., infer) the well context using this data. As used herein, "well context" refers to the rig state, drilling events, and/or well events. Illustrative rig states may include drilling, tripping, pumping, in-connection, etc. Illustrative drilling/well events may include well kick, washout, bit failure, lost circulation, etc.

The well construction control console 420 may include one or more displays (e.g., two are shown: 422, 424). The well context may be transmitted to the displays 422, 424 in the well construction control console 420 in real-time where the well context may be displayed. For example, the first display 422 may show the video recorded by the video camera 362, and the second display 424 may show rig information such as equipment operation information, drilling process information, well control information, downhole information, etc. The rig information may be or include at least a portion of the data from the surface sensor 360 and/or the downhole sensor 364. The well context may be saved together with the data from the surface sensor 360, the video from the video camera 362, and/or the data from the downhole sensor 364.

In one example, if a kick event is detected by the well construction process inference engine 410, the first display 422 may automatically be switched to shown the video (from the video camera 362) over the mud pit 316. The second display 424 may automatically be switched to show information relevant to the kick, such as flow rate, mud pump volume, fluid pressure, etc., which may be measured by the surface sensor 360 and/or the downhole sensor 364. The first and/or the second display 422, 424 may further automatically show the process instructions and/or equipment operation control interface that allows the operator to mitigate or control the well kick.

At any time during the construction of the wellbore 330, there may be a plurality of people with differing responsibilities working on various operations around the well site 300. These operations may include drilling (e.g., operated by a driller), cementing (e.g., operated by a cementing operator), fluid operation (e.g., operated by a fluid engineer), downhole operations (e.g., operated by a downhole engineer), etc.

The video and rig information may be displayed in such a way that each role or operator is presented with the most relevant information concerning that operator's responsibility. For example, the first display 422 for the cementing engineer may show video of the rig floor or the cement return line. The second display 424 for the cementing engineer may show the information specific to the cementing operation, such as parameter data or relevant equipment control interface while excluding other information that is not relevant to the cementing operation. In another example, the first display 422 for the fluid engineer may show video of the mud pit 314 or the shale shaker. The second display 424 for the fluid engineer may show the information specific to fluid or mud logging concerns such as the level of the mud pit 314, fluid properties, low gravity solid content, and cuttings, and the equipment control interface that may be used to control relevant fluid properties, such as flow rate, tank level, and solid content, etc. In yet another example, depending upon a given event, the first display 422 for the drilling engineer may show video of the rig floor, the level of the mud pit 314, the return line, etc., while the second display 424 may show or highlight information that relates to the ongoing operation.

When the downhole tool 340 is engaging in directional drilling, the tool face, which represents the angle measured in a perpendicular plane to the axis through the drill string 334, may play a role in controlling the trajectory of the wellbore 330. For example, when drilling using a mud motor 350 in sliding mode, a display showing the tool face may help the drilling engineer navigate the trajectory of the wellbore 330 to the desired target. When the mud motor 350 is in sliding mode, drilling of the subterranean formation 332 is initiated through rotation of the drill bit 346 imparted by the mud motor 350 alone without the application of rotational motion of the drill string 334 from the surface 302.

Figure 5:
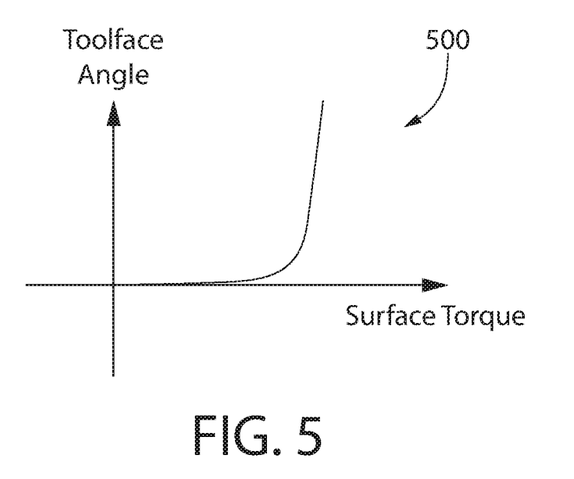
FIG. 5 illustrates a graph showing the relationship between the surface torque (X-axis) and the angle of the tool face (Y-axis), according to an embodiment.

FIG. 5 illustrates a graph 500 showing the relationship between the surface torque (X-axis) and the angle of the tool face (Y-axis) during the steering of the tool face process, according to an embodiment. In some embodiments, there may not be a direct relationship between the angle of the tool face and the surface torque because a certain amount of torque is used to overcome the frictional forces between the drill string 334 and the wall of the wellbore 330. The amount of torque increases as the amount of contact force between the drill string 334 and the wall of the wellbore 330 increases, which may occur as the drill bit 346 advances farther and farther into the deviated section of the wellbore 330. Furthermore, once the surface torque reaches a predetermined amount (e.g., to overcome most of the frictional forces along the drill string 334), a small increase in the surface torque may lead to a large change in the tool face. This may make steering control more difficult (i.e., less reliable).

Figure 6:
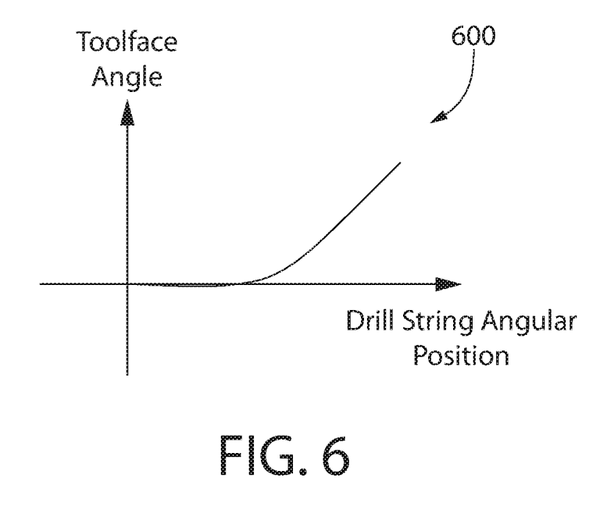
FIG. 6 illustrates a graph showing the relationship between the drill string angular position (X-axis) and the angle of the tool face (Y-axis), according to an embodiment.

FIG. 6 illustrates a graph 600 showing the relationship between the angular position of the drill string at and/or above the surface (X-axis) and the angle of the tool face (Y-axis), according to an embodiment. As shown in FIG. 6, there may be a close (e.g., substantially direct) relationship between the angular position of the drill string at and/or above the surface and the angle of the tool face. The relationship may depend at least partially on the reaction torque during slide drilling. Reactive torque occurs when the rotating motor 350 engages the subterranean formation 332 during drilling. The reaction torque may be determined between two positions. The positions may be, for example, when the motor 350 is rotating while the drill bit 346 is off-bottom, and when the motor 350 is rotating while the drill bit 346 is on-bottom. In another embodiment, the reaction torque may be measured using the downhole sensor 364.

Figure 7:
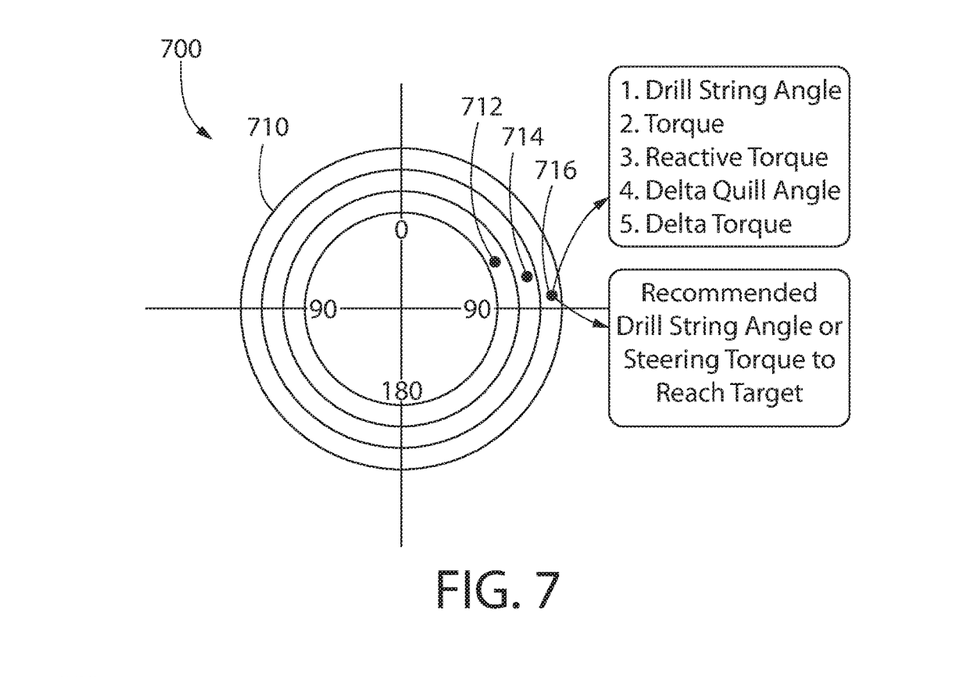
FIG. 7 illustrates a tool face display, according to an embodiment.

FIG. 7 illustrates a tool face display 700, according to an embodiment. The tool face display 700 may include a circular gauge 710 showing the 360 degrees of the tool face. The circular gauge may include a plurality of concentric rings. Each ring may include a survey point 712, 714, 716. For example, a first (e.g., old) survey 712 point may be at 70 degrees in an inner ring, a second (e.g., later) survey point 714 may be at 75 degrees in an intermediate ring, and a third (e.g., most recent) survey point 716 may be at 85 degrees in an outer ring. In some embodiments, the tool face display 700 may also include a current value of the tool face (e.g., gravitational or magnetic tool face), the azimuth angle, and/or the inclination angle.

In addition to showing the tool face at multiple points in time, the tool face display 700 may also show the angular position of the drill string 334 at and/or above the surface, the torque value to steer to the current position, the (e.g., current) reaction torque, the delta drill string angle at and/or above the surface, the delta steering torque, or a combination thereof. The delta drill string angle refers to the current angular position of the drill 334 string minus the previous angular position of the drill string 334. The delta steering torque refers to the current steering torque minus the previous steering torque. This additional information may be shown for the most recent survey point 716, or for each survey point 712, 714, 716.

With this additional information, a model may be generated to provide a recommended angular position of the drill string 334 and/or steering torque for the next steering action to reach the target direction. The model may predict the relationship between the steering angle (e.g., the delta drill string angle) and the expected tool face, a steering advisor may use this prediction to vary one or more parameters of the steering operation. The parameters may be or include the angular position of the drill string 334, the weight on the drill bit 346, or the like.

Figure 8:
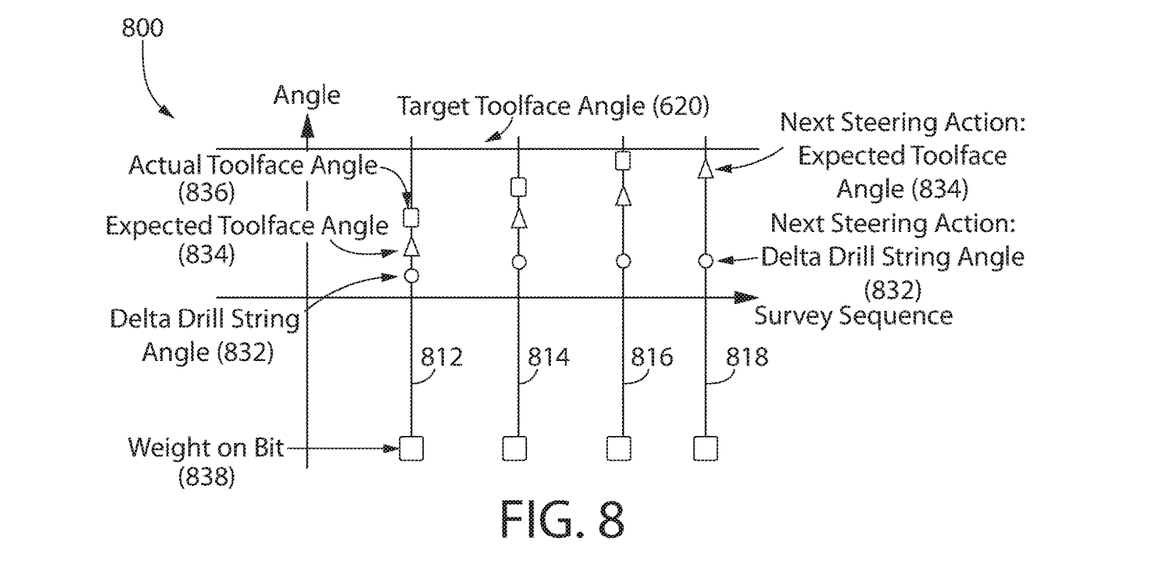
FIG. 8 illustrates a steering advisor display, according to an embodiment.

FIG. 8 illustrates a steering advisor display 800, according to an embodiment. The steering advisor display 800 may include the sequence of survey points 812, 814, 816 on one axis (e.g., the horizontal axis). Three survey points 812, 814, 816 are shown, with the oldest survey point 812 on the left and the most recent survey point 816 on the right. The steering advisor display 800 may also include the target tool face 820. For each survey point 812, 814, 816, additional data may be provided. In this example, the additional data includes the delta surface drill string angle 832, the expected tool face 834, the actual tool face 836, and the weight on the drill bit 838. Here, the delta drill string angle 832 may be the actual delta drill string angle that was applied to the generated tool face reading. The expected tool face 834 may be the tool face that is expected based on the model using the input of the delta drill string angle 832. The actual tool face 836 may be the tool face obtained from the downhole survey at the completion of this particular steering cycle. The weight on the drill bit 838 may include the weight on the drill bit during the drilling cycle before the survey is taken.

The steering advisor display 800 may also include the delta drill string angle 832 for the next steering action 818 (e.g., if this angle is used for the next steering action). The steering advisor display 800 may also include the assumed weight on the drill bit 838 during the next drilling cycle. The steering advisor display 800 may also include the expected tool face 834 for the next steering action 818. If the delta drill string angle 832 above is used to steer, and the weight on the drill bit 838 is as shown, this may be the expected tool face 834.

Figure 9:
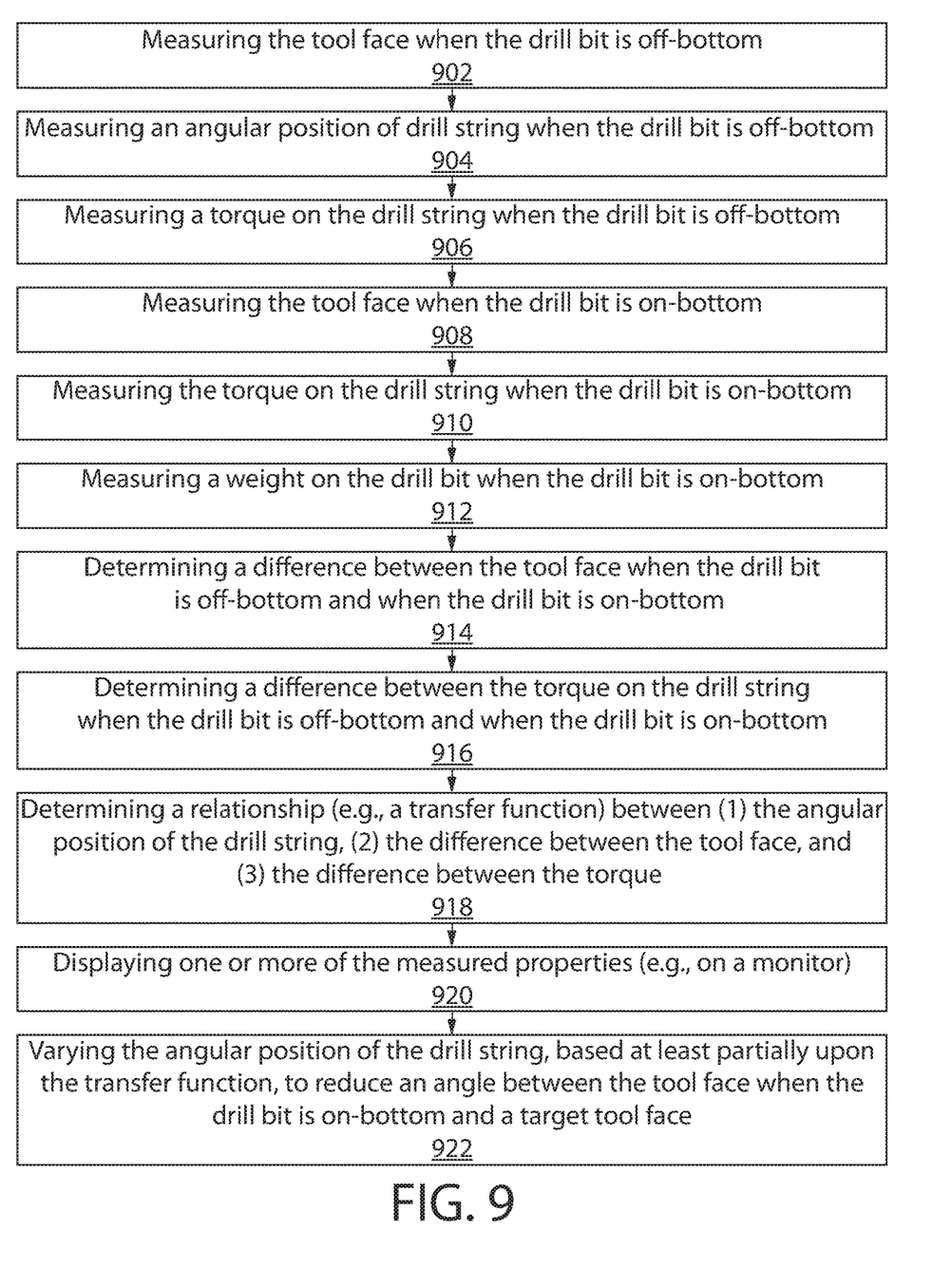
FIG. 9 illustrates a flowchart of a method for steering a downhole tool in a wellbore, according to an embodiment.

FIG. 9 illustrates a flow chart of a method 900 for steering a downhole tool 340 in a wellbore 330, according to an embodiment. The method 900 may include measuring the tool face when the drill bit 346 is off-bottom, as at 902. The method 900 may also include measuring an angular position of the drill string 334 when the drill bit 346 is off-bottom, as at 904. The angular position of the drill string 334 may be measured at the surface 302, rather than downhole. In some embodiments, the angular position of the drill string 334 may include the angular or rotational position of the drill string 334 based the drilling device 308 (e.g., the kelly or top drive quill), the wash pipe, or a combination thereof. For example, the wash pipe may rotate together with the drill string 334. As a result, the orientation of the drill string 334 may be measured from the wash pipe. This measurement may be taken anywhere between the hook 310 and the drill string 334.

The method 900 may also include measuring a torque on the drill string 334 when the drill bit 346 is off-bottom, as at 906. The torque may be measured at the surface. For example, the torque may be measured below the rotary table 306 or surface motor. In another embodiment, the torque may be measured downhole (i.e., in the wellbore 330). For example, the torque may be measured in the downhole tool 340 at a location above the motor 350.

The method 900 may also include measuring the tool face when the drill bit 346 is on-bottom (e.g., while drilling), as at 908. The method 900 may also include measuring the torque on the drill string 334 when the drill bit 346 is on-bottom, as at 910. The torque may be measured at the surface. For example, the torque may be measured below the rotary table 306 or surface motor. In another embodiment, the torque may be measured downhole (i.e., in the wellbore 330). For example, the torque may be measured in the downhole tool 340 at a location above the motor 350. The method 900 may also include measuring a weight on the drill bit 346 when the drill bit 346 is on-bottom, as at 912. The weight may be measured at the surface or downhole.

The method 900 may also include determining a difference between the tool face when the drill bit 346 is off-bottom and when the drill bit 346 is on-bottom, as at 914. The method 900 may also include determining a difference between the torque on the drill string 334 when the drill bit 346 is off-bottom and when the drill bit 346 is on-bottom (referred to as "delta torque"), as at 916. The method 900 may also include determining a relationship (e.g., a transfer function) between (1) the angular position of the drill string 334, (2) the difference between the tool face when drill bit 346 is off-bottom and when the drill bit 346 is on-bottom, and (3) the difference between the torque on the drill string 334 when the drill bit 346 is off-bottom and when the drill bit 346 is on-bottom, as at 918. In some embodiments, the relationship may also include the weight on the drill bit 346 when the drill bit 346 is on-bottom, and/or the wellbore trajectory, etc.

The method 900 may also include displaying the tool face when the drill bit 346 is off-bottom, the angular position of a drill string 334 when the drill bit 346 is off-bottom, the torque on the drill string 334 when the drill bit 346 is off-bottom, the tool face when the drill bit 346 is on-bottom, the torque on the drill string 334 when the drill bit 346 is on-bottom, the weight on the drill bit 346 when the drill bit 346 is on-bottom, the difference between the tool face when the drill bit 346 is off-bottom and when the drill bit 346 is on-bottom, the difference between the torque on the drill string 334 when the drill bit 346 is off-bottom and when the drill bit 346 is on-bottom, or a combination thereof, as at 920.

The method 900 may also include varying the angular position of the drill string 334 (e.g., by varying the angular position of the quill of the top drive), based at least partially upon the transfer function, to reduce an angle between the tool face when the drill bit 346 is on-bottom and a target tool face (also when the drill bit 346 is on bottom), as at 922. As used herein, varying the angular position of the drill string 334 may also include rotating the kelly or quill of the top drive (drill device 308), or any other rotary drive mechanism. Thus, varying the angular position of the drill string 334 may be used to help steer the downhole tool 340 as the downhole tool 340 drills. The angular position of the drill string 334 may be varied while the drill bit 346 is on-bottom (e.g., while drilling). The weight on the drill bit 346 may remain constant as the angular position of the drill string 334 is varied and/or after the angular position of the drill string 334 is varied. However, in other embodiments, the weight on the drill bit 346 may vary while or after the angular position of the drill string 334 is varied. Although one illustrative order of events is provided above, it will be appreciated that other orders are also contemplated herein. For example, the measuring at 902, 904, and 906 may occur in any order.

Figure 10:
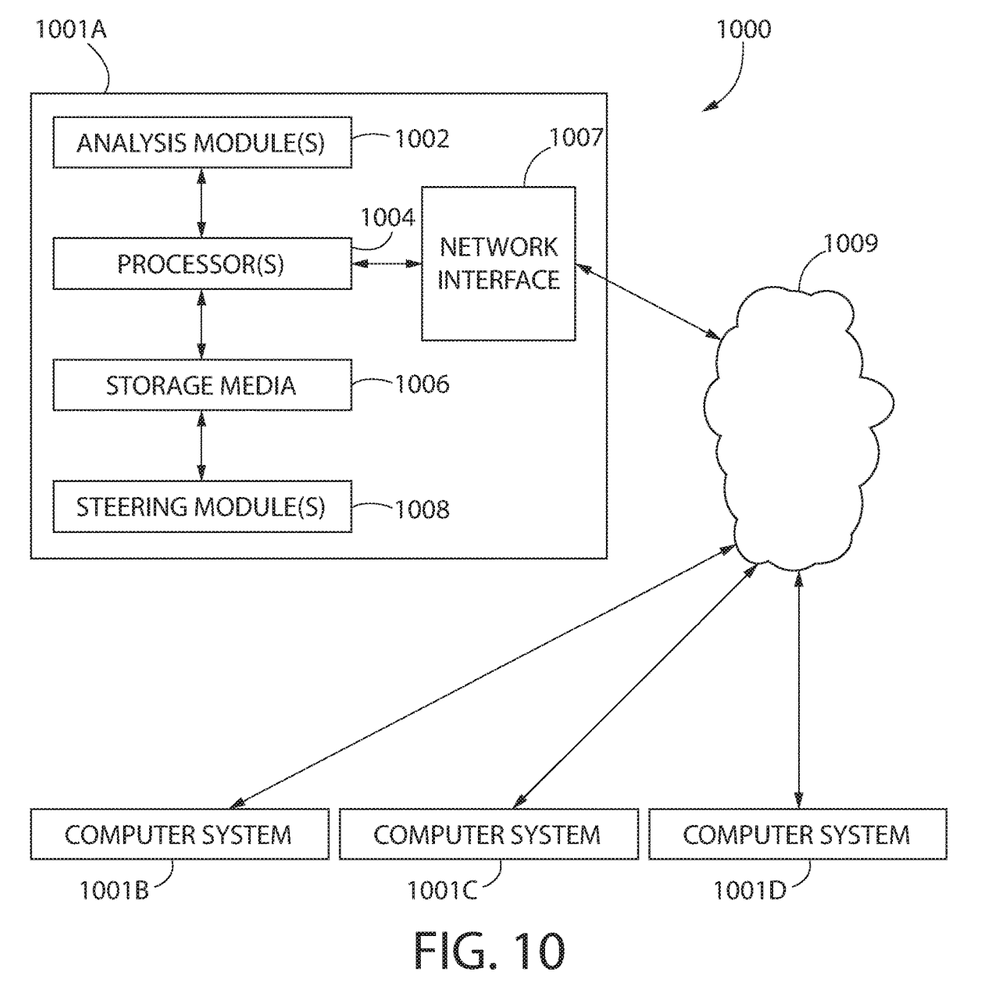
FIG. 10 illustrates a computing system for performing at least a portion of the method, according to an embodiment.

In some embodiments, the methods of the present disclosure may be executed by a computing system. FIG. 10 illustrates an example of such a computing system 1000, in accordance with some embodiments. The computing system 800 may include a computer or computer system 1001A, which may be an individual computer system 1001A or an arrangement of distributed computer systems. The computer system 1001A may be at the surface or part of the downhole tool 340. The computer system 1001A includes one or more analysis modules 1002 that are configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents). The computer system 1001B may be at the surface or part of the downhole tool 340.

A processor may include a microprocessor, microcontroller, processor module or subsystem, programmable integrated circuit, programmable gate array, or another control or computing device.

The storage media 1006 may be implemented as one or more computer-readable or machine-readable storage media. Note that while in the example embodiment of FIG. 10 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURRY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1000 contains one or more steering module(s) 1008. The steering module 1008 may receive measurements from one or more sensors (e.g., sensors 360, 364) and perform one or more portions of the method 900 (e.g., 918, 920, 922).

It should be appreciated that computing system 1000 is only one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for steering a downhole tool in a wellbore, comprising:
    measuring a tool face when a drill bit is off-bottom;
    measuring an angular position of a drill string at the surface when the drill bit is off-bottom;
    measuring a torque on the drill string when the drill bit is off-bottom;
    measuring the tool face when the drill bit is on-bottom;
    measuring the torque on the drill string when the drill bit is on-bottom;
    determining a difference between the tool face when the drill bit is off-bottom and on-bottom;
    determining a difference between the torque on the drill string when the drill bit is off-bottom and on-bottom;
    determining a transfer function comprising the angular position of the drill string, the difference between the tool face, and the difference between the torque; and
    varying the angular position of the drill string at the surface, based at least partially upon the transfer function, to reduce an angle between the tool face when the drill bit is on-bottom and a target tool face.

2. The method of claim 1, further comprising measuring a weight on the drill bit when the drill bit is on-bottom.

3. The method of claim 2, further comprising displaying:
    the angular position of the drill string when the drill bit is off-bottom,
    the tool face when the drill bit is on-bottom,
    the weight on the drill bit when the drill bit is on-bottom,
    the difference between the tool face when the drill bit is off-bottom and when the drill bit is on-bottom.

4. The method of claim 2, further comprising displaying:
    the tool face when the drill bit is off bottom, and
    the difference between the torque on the drill string when the drill bit is off bottom and when the drill bit is on bottom.

5. The method of claim 2, further comprising displaying:
    the torque on the drill string when the drill bit is off bottom, and the torque on the drill string when the drill bit is on bottom.

6. The method of claim 2, wherein the transfer function further comprises the weight on the drill bit.

7. The method of claim 6, wherein the weight on the drill bit remains constant as the angular position of the drill string is varied.

8. The method of claim 6, further comprising varying the weight on the drill bit to reduce the angle between the tool face, when the drill bit is on-bottom, and the target tool face.

9. The method of claim 1, wherein the torque on the drill string is measured at the surface.

10. The method of claim 1, wherein the torque on the drill string is measured downhole.

11. The method of claim 1, wherein the angular position of the drill string comprises an angular position of a drill string at the surface.

12. The method of claim 1, wherein the angular position of the drill string is varied to steer the downhole tool.

13. A system for steering a downhole tool in a wellbore, comprising:
a first sensor coupled to the downhole tool;
a second sensor positioned at a surface location, wherein the first sensor, the second sensor, or both sensors are configured to measure:
a tool face when a drill bit of the downhole tool is off-bottom;
an angular position of a drill string at the surface when the drill bit is off-bottom;
a torque on the drill string when the drill bit is off-bottom;
the tool face when the drill bit is on-bottom; and
the torque on the drill string when the drill bit is on-bottom; and
a processor system configured to:
determine a transfer function comprising the angular position of the drill string, a difference between the tool face, and a difference between the torque; and
cause the angular position of the drill string at the surface to vary, based at least partially upon the transfer function, to reduce an angle between the tool face when the drill bit is on-bottom and a target tool face.

14. The system of claim 13, wherein the first sensor, the second sensor, or both sensors are configured to measure a weight on the drill bit when the drill bit is on-bottom.

15. The system of claim 14, wherein a computing system comprises a monitor configured to display:
the angular position of the drill string when the drill bit is off-bottom,
the tool face when the drill bit is on-bottom,
the weight on the drill bit when the drill bit is on-bottom, and
a the difference between the tool face when the drill bit is off-bottom and when the drill bit is on-bottom.

16. The system of claim 15, wherein the monitor is configured to further display:
the tool face when the drill bit is off bottom, and
the difference between the torque on the drill string when the drill bit is off bottom and when the drill bit is on bottom.

17. The system of claim 16, wherein the monitor is configured to further display:
the torque on the drill string when the drill bit is off bottom, and
the torque on the drill string when the drill bit is on bottom.

18. The system of claim 14, wherein the transfer function further comprises the weight on the drill bit.

19. The system of claim 13, wherein a weight on the drill bit remains constant as the angular position of the drill string is varied.

20. The system of claim 13, wherein a computer system causes a weight on the drill bit to vary to reduce the angle between the tool face, when the drill bit is on-bottom, and the target tool face.

21. The system of claim 13, wherein the first sensor measures the torque on the drill string.

22. The system of claim 13, wherein the first sensor measures the tool face, and wherein the second sensor measures the angular position of the drill string.

23. The system of claim 13, wherein the angular position of the drill string comprises an angular position of the drill string at the surface.

24. The system of claim 13, wherein the angular position of the drill string is varied to steer the downhole tool.

* * * * *